Figure 1:
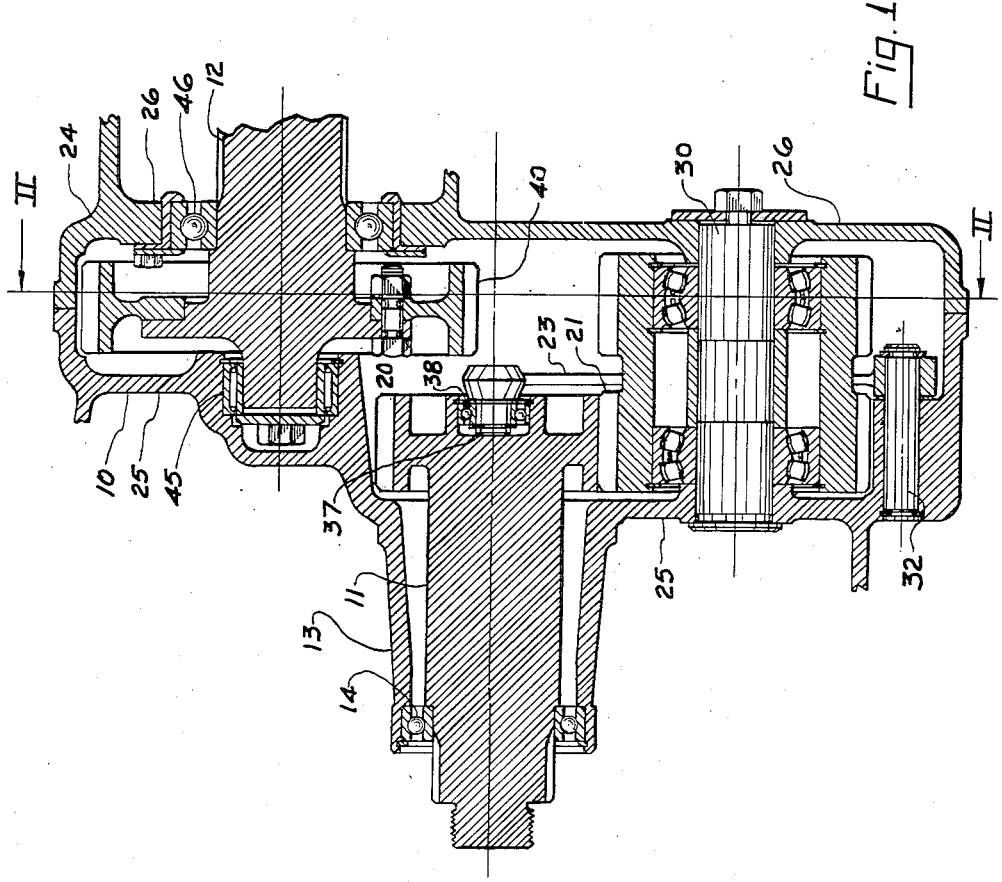

March 25, 1958 C. J. LUCIA ET AL 2,827,798
GEAR TRAIN WITH LINK SUPPORTED GEAR
Filed April 18, 1956 2 Sheets-Sheet 1

INVENTOR.
C. J. Lucia and H. L. Misch
BY
Wilson, Redrow & Sadler

March 25, 1958  C. J. LUCIA ET AL  2,827,798
GEAR TRAIN WITH LINK SUPPORTED GEAR
Filed April 18, 1956  2 Sheets-Sheet 2

INVENTOR.
C. J. Lucia and H. L. Misch
BY
Wilson, Redrow & Sadler

United States Patent Office 2,827,798
Patented Mar. 25, 1958

2,827,798

GEAR TRAIN WITH LINK SUPPORTED GEAR

Carroll J. Lucia, Pontiac, and Herbert L. Misch, Royal Oak, Mich., assignors to Studebaker-Packard Corporation, Detroit, Mich., a corporation of Michigan Application April 18, 1956, Serial No. 579,048

5 Claims. (Cl. 74—410)

This invention relates to gear train mechanisms and particularly such mechanisms in which one of the gears thereof is a gear which is movable laterally with respect to its axis.

It is common practice to provide a movable gear train having a gear which is movable laterally with respect to its axis, that is, a gear for which the bearing support therefor, if any, does not function, or only partially functions, to center the gear. In constructions of this type the movable gear may be centered by providing three gears in mesh with the movable gear, the three gears being spaced 120 degrees apart and having axes which are fixed with respect to each other. From the mechanical standpoint this is a satisfactory arrangement for centering a movable gear. A disadvantage of this arrangement, however, is that a relatively large housing or casing for the gear train must be provided to accommodate the space requirements of the three centering gears. Another disadvantage is that one of the centering gears, and a gear with which one or two of the three centering gears is to be connected, can only be supported on one side thereof by the housing because of the space occupied by the three centering gears. The disadvantages of having gears mounted on overhanging shafts are therefore encountered.

The above mentioned disadvantages are avoided, and other advantages are obtained, in a gear train constructed in accordance with the present invention. In general the construction of the present invention involves the providing of a gear train in which only two gears and a link are utilized to center a movable gear. In conjunction with this feature the two centering gears, and a gear connected to one or both of the centering gears, may each be supported on both sides thereof by the housing in which the gear train is mounted. The disadvantages of having gears mounted on overhanging shafts are therefore avoided.

Main objects of the present invention are to provide a new and improved gear train embodying a movable gear in which (1) only two gears and a link are utilized to center the movable gear, (2) the housing requirement for the centering gears is relatively small, and (3) the centering gears and a gear connected to one or both of the centering gears may each be supported on both sides thereof by the housing for the gear train.

Other objects of the invention will become apparent from the following specification, the drawings relating thereto, and the appended claims.

Figure 2:
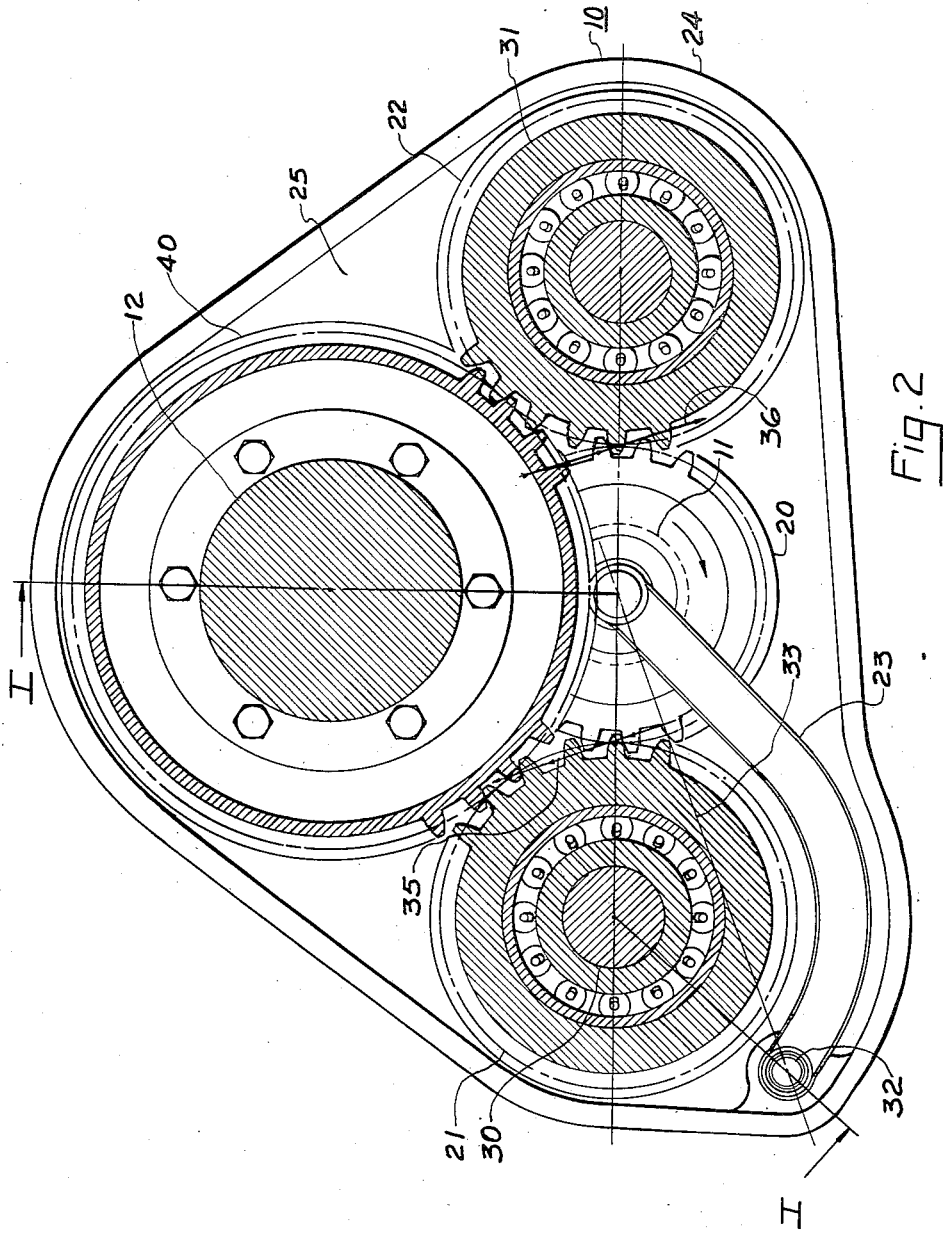

In the drawing:

Fig. 1 is a longitudinal sectional view of a gear train constructed in accordance with the invention taken on line I—I of Fig. 2; and Fig. 2 is a cross-sectional view taken on line II—II of Fig 1.

In the drawing there is shown one embodiment of the invention which constitutes reduction gearing for use with a 400 H. P., 2000 R. P. M. diesel engine.

A supporting structure or housing 10 is provided for mounting the gear train mechanism. In addition to reduction gearing the gear train comprises a shaft 11, which may be a driving shaft, and shaft 12, which may be the driven shaft, laterally offset from shaft 11.

Shaft 11 is rotatably supported at one end thereof by a cylindrical housing portion 13, there being provided a ball bearing 14 between housing portion 13 and shaft 11. Shaft 11, by virtue of being supported at only one end, is referred to herein as a floating shaft because the bearing 14 allows a limited amount of radial movement of the shaft at the opposite or nonsupported end of the shaft.

A gear 20 is mounted at the nonsupported end of shaft 11 at a point axially spaced from bearing 14. Gear 20 is referred to herein as a movable gear by virtue of being mounted at the nonsupported end of floating shaft 11.

A pair of gears 21 and 22 and a link 23 are provided for centering movable gear 20. The pair of gears 21 and 22 are in meshing engagement with movable gear 20 and, as illustrated herein, are positioned on diametrically opposite sides of gear 20. A housing portion 24, of larger proportions than housing portion 13, is provided to accommodate the space requirements of the pair of gears 21 and 22 and link 23. Walls 25 and 26 of housing portion 24 are adapted to receive parallel shafts 30 and 31, thereby supported at both ends, upon which the pair of gears 21 and 22 are rotatably mounted. A shaft 32, upon which link 23 is mounted for pivotal movement relative thereto, is mounted in housing portion 24 in parallel relation to shafts 30 and 31. The axes of shafts 30, 31 and 32 are accordingly in fixed positions relative to each other although such axes, when considered as a group, need not necessarily be in fixed angular relationship with respect to the axis of shaft 11. The other end of link 23 is operably connected to shaft 11, in a manner which permits rotation of movable gear 20 and shaft 11 relative to link 23, for centering or maintaining the axis of movable gear 20 in a fixed position relative to the axes of the pair of gears 21 and 22.

Referring now to the centering of movable gear 20 by the pair of gears 21 and 22 and link 23, it will be understood that the gears 20, 21 and 22 are of a standard type having involute gear teeth. The path of contact between the teeth of meshing involute gears, referred to as the pressure line, is a straight line and the angle (pressure angle) of the pressure line remains constant during meshing of the gears. Conventional involute gears have a pressure angle of 14½ degrees or 20 degrees. These angles have a long history of development and are accepted as standards of good practice.

In Fig. 2 of the drawing the pressure lines 35 and 36 which act between movable gear 20 and the pair of gears 21 and 22, assuming gear 20 is centered, has an angle illustrated as being 20 degrees. A clockwise direction is assumed for movable gear 20. The 20 degree pressure angle is measured with respect to a line extending normal to the line of centers which is a line extending through the axes of the meshing gears. The two pressure lines 35 and 36, which act in opposite directions, represent the forces applied to the pair of gears 21 and 22 and the reaction forces on movable gear 20. As the two forces, represented by pressure lines 35 and 36 act in opposite directions and are equal in magnitude, the pressure lines are effective to prevent movable gear 20 from moving parallel to the pressure lines in either direction.

The link 23 is provided to prevent movement of movable gear in a direction normal to pressure lines 35 and 36. Link 23 is operably connected to shaft 11, as mentioned above. The axis of shaft 32 about which link 23 pivots is located so that a line 33 extending therethrough and through the axis of movable gear 20, in its centered position, is normal to pressure lines 35 and 36. The other end of link 23 is operably connected to shaft 11 by means of a pin 37 and ball bearing 38 in a manner which permits shaft 11 and gear 20 to rotate relative to link 23 about the axis of shaft 11.

Link 23 is illustrated herein as a curved member because it is connected to movable gear 20, or operably connected to shaft 11, at a point which is in the same general plane as gear 21 and is curved to avoid interference with gear 21. As link 23 functions to prevent movement of movable gear 20 in a direction normal to pressure lines 35 and 36, it will be understood that link 23 may be mounted in a position 180° displaced from the position illustrated in Fig. 2.

In the illustrated embodiment of the invention, shaft 11 and gear 20 are incidentally shown as being integral. Regardless of whether shaft 11 and gear 20 are integral, it is merely a matter of choice or preference whether link 23 is connected to the shaft 11 or the gear 20. In the illustrated embodiment, for example, where shaft 11 and gear 20 are integral, link 23 may be considered connected to either the shaft or the gear. A statement that link 23 is operably connected to shaft 11 is intended to cover the connecting of link 23 to either shaft 11 or gear 20.

The length of link 23, with regard to the distance between the axis of shaft 32 and the axis of bearing 38, is such that link 23 may be pivoted to a position where the axis of shaft 11 and gear 20 is coaxial with the axis of bearing 14 which supports shaft 11. In designing the gear train the axis of bearing 14 is fixed and positioned with respect to the axes of the pair of gears 21 and 22 so that when the axis of gear 20 is coaxial with the axis of bearing 14, gear 20 will be positioned midway between gears 21 and 22. For a specific construction, where gears 21 and 22 are of equal diameter, gear 20 will not only be positioned midway between gear 21 and 22 but the axis of gear 20 will be positioned midway and on a line extending between the axes of gears 21 and 22.

Link 23 may be operably connected to shaft 11 at any point along the shaft which is sufficiently axially spaced from bearing 14 to allow the link to function to maintain the axis of shaft 11 coaxial with the axis of bearing 14. As viewed in Fig. 1, for example, link 23 could be connected to shaft 11 at a point between bearing 14 and gear 20 or even to the left of bearing 14 if the length of shaft 11 were extended a sufficient distance in that direction.

Referring now to the driving of shaft 12 by shaft 11, or vice versa, shaft 12 is provided with a gear 40 which is in axially spaced relation to movable gear 20 and in meshing engagement with at least one of the pair of gears 21 and 22. Gear 40 is illustrated as being in mesh with both gears 21 and 22 which are provided with axially extended portions which extend a greater axial distance away from bearing 14 than does movable gear 20. Gear 40 is in radially overlapping relation with respect to floating gear 20. Shaft 12, upon which gear 40 is mounted, is supported on each side of gear 40 by walls 25 and 26 of the housing portion 24. Bearings 45 and 46 are provided between shaft 12 and housing walls 25 and 26. In effect, the axis of gear 40 is radially spaced from the outside diameter of movable gear 20.

During operation of the gear train the movable gear 20 will be centered by the pair of gears 21 and 22 and link 23 in the manner described above. The shaft 11 to which movable gear 20 is attached is free to tilt and the movable gear 20 is thus free to find an axis of rotation which will cause movable gear 20 to be subjected to the least amount of stress. This is of course of importance with regard to reducing wear on the gear teeth, the obtaining of quieter operation, and the prevention of unequal and excessive loads being applied to the bearings and shafts. The freedom of movable gear 20 to find its own axis of rotation is also of importance from the standpoint that this construction automatically compensates for and makes allowances for changes in the load to be driven, which affects the alignment by reason of the deflection which results from the load, and the wear of the bearings which changes the original alignment as the bearings become worn.

The invention may be embodied in other specific forms without departing from the spirit or essential characteristics thereof. The present embodiment of the invention is therefore to be considered in all respects as illustrative and not restrictive, the scope of the invention being indicated by the appended claims rather than by the foregoing description, and all changes which come within the meaning and range of equivalency of the claims are therefore intended to be embraced therein.

It is claimed and desired to secure by Letters Patent:

1. A gear train comprising a pair of gears mounted to rotate about parallel axes which are fixed with respect to each other, a gear disposed between said pair of gears in meshing engagement therewith, a link mounted for pivotal movement about an axis which is parallel to and fixed with respect to the axes of said pair of gears, said link being operably connected to said gear for positioning the axis thereof midway between the axes of said pair of gears, the fixed axis of said link being positioned so that a line extending therethrough and through a point mid-way between the axis of said pair of gears is perpendicular to one set of pressure lines acting between the teeth of said gear and said pair of gears.

2. A gear train comprising a gear, a pair of gears disposed on diametrically opposite sides of said gear and mounted to rotate about parallel axes which are fixed with respect to each other, a link mounted for pivotal movement about an axis which is parallel to and fixed with respect to the axes of said pair of gears, said link being operably connected to said gear for maintaining the axis thereof in a fixed position relative to the axes of said pair of gears during operation of the gear train, the fixed axis of said link being positioned so that a line extending therethrough and through the axis of said gear is perpendicular to one set of pressure lines acting between the teeth of said gear and said pair of gears.

3. A gear train comprising supporting structure, a bearing mounted on said supporting structure, a shaft journaled in said bearing, a gear mounted on said shaft at a point axially spaced from said bearing, a pair of gears disposed on diametrically opposite sides of said gear and mounted to rotate about parallel axes which are fixed with respect to each other, a link mounted for pivotal movement about an axis which is parallel to and fixed with respect to the axes of said pair of gears, said link being operably connected to said shaft at a point axially spaced from said bearing for maintaining the axis of said gear in a fixed position relative to the axes of said pair of gears during operation of the gear train, the fixed axis of said link being positioned so that a line extending therethrough and through the axis of said bearing is perpendicular to one set of pressure lines acting between the teeth of said gear and said pair of gears.

4. A gear train comprising supporting structure, a bearing mounted on said supporting structure, a shaft journaled in said bearing, a first gear mounted on said shaft at a point axially spaced from said bearing, a pair of gears disposed on diametrically opposite sides of said first gear and mounted to rotate about parallel axes which are fixed with respect to each other, at least one of said pair of gears having an axially extending portion which extends a greater axial distance in the direction away from said bearing than said first gear, a fourth gear in meshing engagement with said axially extended portion of at least one of said pair of gears mounted for rotation about an axis which is fixed relative to the axes of said pair of gears, a link mounted for pivotal movement about an axis which is parallel to and fixed with respect to the axes of said pair of gears, said link being operably connected to said shaft at a point axially spaced from said bearing for maintaining the axis of said first gear in a fixed position relative to the axes of said pair of gears during operation of the gear train, the fixed axis of said link being positioned so that a line extending therethrough and through the axis of said bearing is perpendicular to one set of pressure lines acting between the teeth of said first gear and said pair of gears.

5. A gear train comprising supporting structure, a bearing mounted on said supporting structure, a shaft journaled in said bearing, a first gear mounted on said shaft at a point axially spaced from said bearing, a pair of gears disposed on diametrically opposite sides of said first gear and mounted to rotate about parallel axes which are fixed with respect to each other, each gear of said pair of gears being supported on each side thereof by said supporting structure, at least one of said pair of gears having an axially extending portion which extends a greater axial distance in the direction away from said bearing than said first gear, a fourth gear in meshing engagement with said axially extended portion of at least one of said pairs of gears mounted for rotation about an axis which is fixed relative to the axes of said pair of gears, said fourth gear being supported on each side thereof by said supporting structure and the axis of said fourth gear being radially spaced from the outside diameter of said first gear, a link mounted for pivotal movement about an axis which is parallel to and fixed with respect to the axes of said pair of gears, said link being operably connected to said shaft at a point axially spaced from said bearing for maintaining the axis of said first gear in a fixed position relative to the axes of said pair of gears during operation of the gear train, the fixed axis of said link being positioned so that a line extending therethrough and through the axis of said bearing is perpendicular to one set of pressure lines acting between the teeth of said first gear and said pair of gears.

References Cited in the file of this patent

UNITED STATES PATENTS

| | | |
|---|---|---|
| 1,148,478 | Jepson | July 27, 1915 |
| 2,441,901 | Petersen | May 18, 1948 |